Patented Dec. 23, 1952

2,623,059

UNITED STATES PATENT OFFICE 2,623,059

BETA-DITHIOCARBAZYL CARBOXYLIC ACID COMPOUNDS AND THEIR PREPARATION

Roger A. Mathes, Akron, Ohio, assignor to The B. F. Goodrich Company, New York, N. Y., a corporation of New York No Drawing. Application December 16, 1950, Serial No. 201,229

7 Claims. (Cl. 260—455)

This invention relates to beta-dithiocarbazyl derivatives of carboxylic acids, particularly propionic acid, and to a method of preparing the same by reacting a beta-lactone with a salt of a dithiocarbazic acid.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner, beta-propiolactone (also called hydracrylic acid lactone) which has the structure

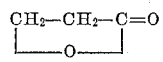

is economically obtained from ketene and formaldehyde.

It has now been discovered that beta-propiolactone, and also other saturated aliphatic beta-lactones, will react with salts of dithiocarbazic acids to form salts of beta-dithiocarbazyl carboxylic acids, and the free acids on acidification, which acids and salts are new compounds useful for a variety of purposes.

The reaction of beta-lactones with salts of dithiocarbazic acids proceeds in general as represented by the following equation:

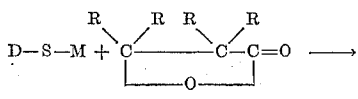

Salt of dithiocarbazic acid    Beta-lactone

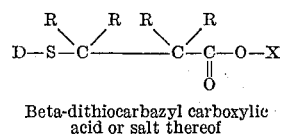

Beta-dithiocarbazyl carboxylic acid or salt thereof where D is a thiocarbazyl

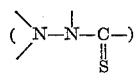

radical including unsubstituted and substituted thiocarbazyl radicals; M is a positive salt forming group, each R is a member of the class consisting of hydrogen or a substituent radical, and X is a member of the class consisting of hydrogen or a positive salt-forming group.

The reaction depicted in the above equation has been found to proceed quite readily without special conditions whenever it is possible to bring the reactants into effective contact with one another. Since dithiocarbazates are not appreciably soluble in beta-lactones, bringing together of the reactants is ordinarily accomplished by the use of a solvent in which the salt will dissolve and ionize, and which also dissolves the beta-lactone. Many beta-lactones and many dithiocarbazic acid salts are soluble in water; hence, the carrying out of the reaction in aqueous solution is by far the most convenient method of procedure, although in some instances it may be desirable to employ other polar solvents such as alcohols.

As indicated by the general equation, one molecular proportion of beta-lactone for each molecular proportion of the dithiocarbazate is stoichiometrically required for the reaction and substantially this amount is preferably employed, but an excess of either of the reactants may be used without any substantial influence on the yield of products. Other conditions for the reaction, such as temperature and pressure, are not critical and may be varied widely. Highest yields of the desired product are generally secured when working at temperatures of 0° C. to 100° C., preferably at 0° C. to 50° C., and at atmospheric pressure. The most convenient temperature, especially when the reaction is carried out in aqueous solution is from about 10° C. to 30° C., since the reaction is exothermic and this temperature is maintained without appreciable heating or cooling of the solution, and since the dithiocarbazates tend to become unstable at high temperatures. Temperatures as low as —20° C. or lower, or as high as 150° C. or higher, however, are also operative.

Any desired salt of a dithiocarbazic acid may be used to react with the beta-lactones. Since the reaction is preferably conducted in aqueous solution, dithiocarbazates which are water-soluble are, of course, preferably used. Examples of preferred salts of dithiocarbazic acids include the alkali metal and ammonium salts of unsubstituted dithiocarbazic acid, such as ammonium dithiocarbazate, potassium dithiocarbazate, sodium dithiocarbazate and the like. Other dithiocarbazates which may be utilized are those in which an organic radical is attached to one or both of the nitrogen atoms of the thiocarbazyl radical, which organic radical may be either aliphatic, aromatic or alicyclic in nature, and is preferably composed only of hydrogen and carbon atoms. Typical examples of such substituted dithiocarbazates include the alkali metal and ammonium salts of mono- and di-alkyl-dithiocarbazic acids wherein one or both of the hydrogen atoms attached to the terminal nitrogen atom are replaced by organic radicals, such as 2,2-dimethyl, 2,2-diethyl, 2,2-dipropyl, 2,2-dihexyl, 2,2-didodecyl, 2-ethyl, 2-propyl, 2-hexyl and 2-decyl dithiocarbazic acids; alkali metal and ammonium salts of dialkyl and trialkyl dithiocarbazic acids wherein at least one hydrogen atom on each nitrogen atom is replaced by an alkyl radical, such as 1,2-diethyl, 1,2,2-triethyl, 1,2-dodecyl, 1-ethyl, 2-methyl, 2,2-dipropyl, 1-ethyl, and 1-ethyl, 2-butyl, 2-methyl dithiocarbazic acids; and alkali metal and ammonium salts of dithiocarbazic acids wherein the hydrogen atom attached to the N'-nitrogen atom is replaced by an alkyl radical, such as 1-ethyl, 1-butyl, 1-hexyl and 1-nonyl dithiocarbazic acids.

In addition to the salts of dithiocarbazic acids listed in the foregoing paragraph, those dithiocarbazic acid salts wherein one or more of the hydrogen atoms attached to nitrogen are replaced by aryl, cycloalkyl, alkylene or other substituent groups may also be advantageously reacted with beta-lactones according to the present invention. Although the alkali metal and ammonium salts and other water-soluble salts of dithiocarbazic acids are preferred, the use of other salts of dithiocarbazic acids is not excluded.

It will be noted that all of the dithiocarbazic acid salts which are reacted with beta-lactones in accordance with this invention possess the structure

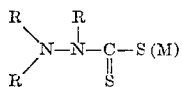

wherein each R is hydrogen or an organic substituent. These compounds may be prepared in several different ways; for example, one method is described by Losanitch, Journal of the Chemical Society, vol. 119, page 763 (1921).

Beta-propiolactone, the simplest possible beta-lactone, is the preferred beta-lactone for use in this invention because of its low cost, and the ease with which it reacts with dithiocarbazates to produce beta-dithiocarbazyl propionic acid compounds. However, the homologs of beta-propiolactone, that is, other saturated aliphatic beta-lactones such as beta-butyrolactone, beta-isobutyrolactone, beta-valerolactone, beta-n-caprolactone, alpha-ethyl-beta-propiolactone, alpha-isopropyl-beta-propiolactone, alpha-butyl-beta-propiolactone, alpha-methyl-beta-butyrolactone, alpha-ethyl-beta-butyrolactone, beta-methyl-beta-valerolactone and the like may also be used, as may other beta-lactones, to produce numerous other beta-dithiocarbazyl carboxylic acid compounds. All of these beta-lactones possess the structure

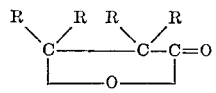

wherein each R is hydrogen or an alkyl radical, preferably a lower alkyl radical.

The beta-dithiocarbazyl carboxylic acids and their salts obtained as products of the reaction are useful organic compounds. Besides being useful as intermediates in the preparation of other compounds, the free acids and the alkali metal and ammonium salts thereof are useful when combined with a fluent carrier, as agents for the control of insect, as fungicides, and for other biological purposes. These compounds are also useful as blowing agents in the preparation of sponge from natural and synthetic rubbery materials. All of these compounds are characterized structurally by possessing a dithiocarbazyl radical attached to a carbon atom in beta-position to a carboxylic acid function consisting of a carbonyl group attached to an oxygen atom which is in turn attached to a positive radical of an ionizable compound, such as hydrogen (the positive radical of acids and water) or an ammonium, substituted ammonium or metallic radical (all of which are positive radicals of bases and salts).

Of these compounds, the beta-dithiocarbazyl propionic acid compounds are particularly important because of the low cost with which they may be prepared from dithiocarbazates and beta-propiolactone. Such compounds possess the general formula:

$$D-S-CH_2-CH_2-\underset{\underset{O}{\|}}{C}-O-X$$

wherein D is a thiocarbazyl radical (a radical whose connecting valence is attached to a thiono group in turn attached to an azo (—N:N—) nitrogen atom, preferably of the formula

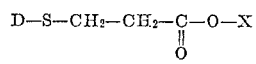

where R is hydrogen or hydrocarbon, particularly alkyl, and X is hydrogen (the compound then being an acid) or an ammonium or substituted ammonium radical or a radical having its valence on a metallic element (the compound then being a salt).

In order further to illustrate the invention, the following specific examples of typical compounds of the types described, and the method of preparing them are hereinafter set forth, but it is to be understood that the invention is not limited thereto. Unless otherwise indicated, all parts are by weight.

*Example I*

62.5 parts (0.5 mole) of ammonium dithiocarbazate (prepared by adding ammonia to an alcohol solution of hydrazine monohydrate and adding carbon disulfide to the resulting mixture), in the form of an aqueous solution containing 40% by volume of the ammonium dithiocarbazate are admixed with 150 parts of water. 36 parts (0.5 mole) of beta-propiolactone are then slowly added to the aqueous solution while maintaining the temperature at about 10° to 15° C. with external cooling. Upon acidification of this reaction mixture with hydrochloric acid of 35% concentration, 47.3 parts (53%) of beta-dithiocarbazyl propionic acid are precipitated. The product is a white crystalline solid melting at 109–111° C.

| Analysis | Calculated for $C_4H_8O_2N_2S_2$ | Found |
|---|---|---|
| Per Cent C | 26.65 | 26.68 |
| Per Cent H | 4.47 | 4.46 |
| Per Cent N | 15.55 | 15.48 |

*Example II*

22.2 parts (0.1 mol) of potassium phenyl dithiocarbazate

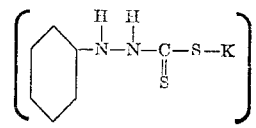

in the form of an aqueous solution containing 20% by volume of the dithiocarbazate and 7.2 parts (0.1 mole) of beta-propiolactone are admixed at a temperature of about 10° C. by adding the beta-propiolactone to the dithiocarbazate over a 15 minute period. Hydrochloric acid of 10% concentration is then added to precipitate beta-phenyl dithiocarbazyl propionic acid. 22 parts (87%) of a cream colored solid melting at 130–131° C. after crystallization from chloroform are obtained.

| Analysis | Calculated for $C_{10}H_{12}O_2N_2S_2$ | Found |
|---|---|---|
| Per Cent C | 46.86 | 46.52 |
| Per Cent H | 4.72 | 4.57 |
| Per Cent N | 10.93 | 10.83 |

Similarly, when other dithiocarbazates or other beta-lactones selected from those disclosed hereinabove are substituted in the examples, solid, crystalline beta-dithiocarbazyl carboxylic acids are again obtained in good yield.

Numerous variations and modifications will be apparent to those skilled in the art and are included within the spirit and scope of the invention as defined in the appended claims.

I claim:

1. The method of preparing a beta-dithiocarbazyl carboxylic acid compound which comprises reacting in aqueous solution a water-soluble saturated aliphatic beta-lactone with a water-soluble salt of a dithiocarbazic acid.

2. The method of preparing a beta-dithiocarbazyl propionic acid compound which comprises reacting in aqueous solution beta-propiolactone with a water-soluble salt of a dithiocarbazic acid.

3. The method of preparing beta-dithiocarbazyl propionic acid which comprises reacting in aqueous solution beta-propiolactone with a water soluble salt of dithiocarbazic acid, and then acidifying the solution with hydrochloric acid.

4. The method of preparing beta-N-phenyl dithiocarbazyl propionic acid which comprises reacting in aqueous solution beta-propiolactone with a water-soluble salt of N-phenyl dithiocarbazic acid, and then acidifying the solution with hydrochloric acid.

5. As a new chemical compound, a beta-dithiocarbazyl carboxylic acid compound of the structure

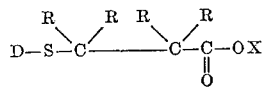

wherein D is a thiocarbazyl radical, each R is a member of the class consisting of hydrogen and lower alkyl radicals and X is a member of the class consisting of hydrocarbon and positive salt forming groups.

6. New chemical compounds selected from the class consisting of beta-dithiocarbazyl propionic acid and its salts.

7. New chemical compounds selected from the class consisting of beta-2-phenyl dithiocarbazyl propionic acid and its salts.

ROGER A. MATHES.

REFERENCES CITED

The following references are of record in the file of this patent:

UNITED STATES PATENTS

| Number | Name | Date |
|---|---|---|
| 2,474,839 | Gresham | July 5, 1949 |